Patented Oct. 30, 1923.

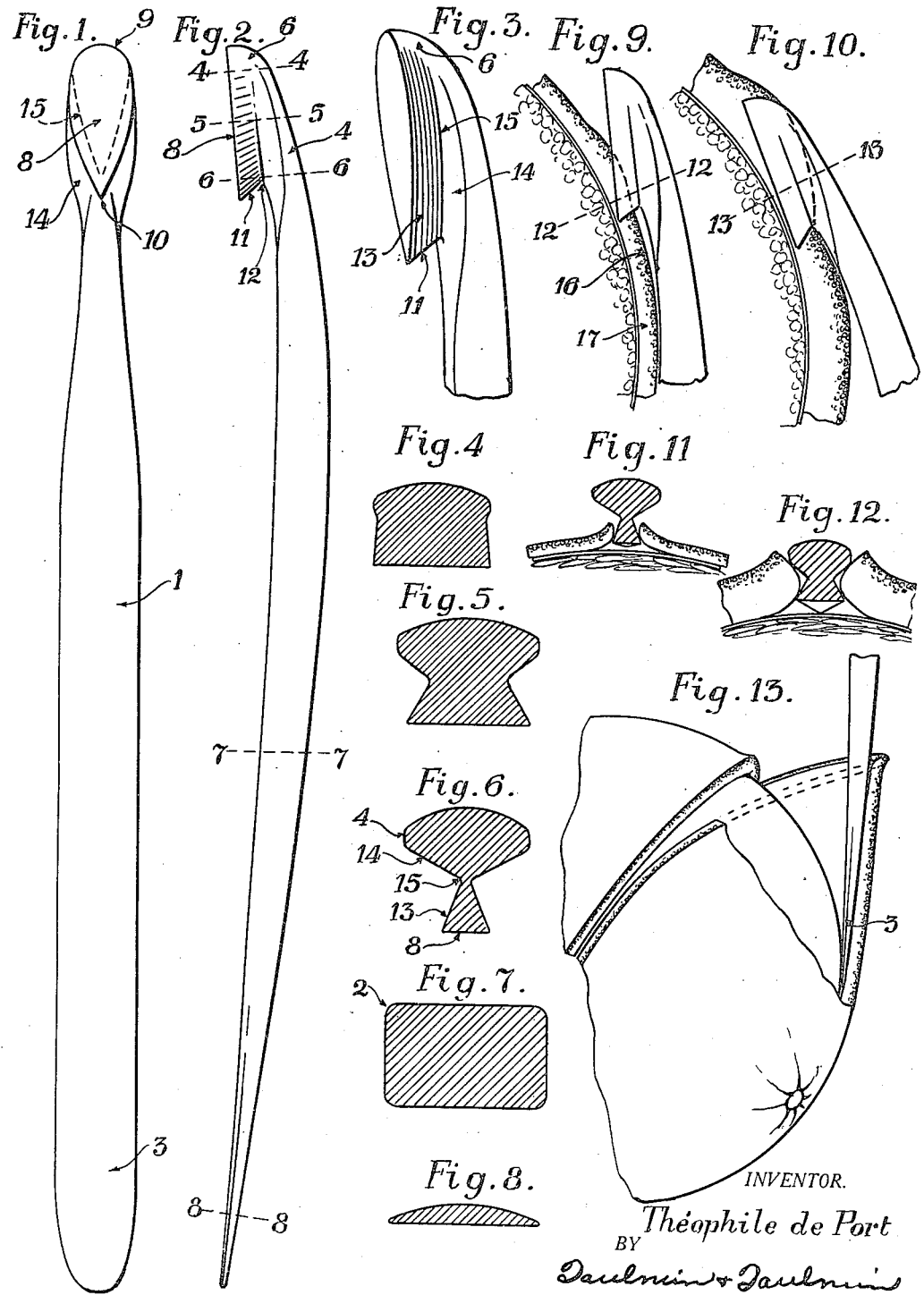

1,472,462

UNITED STATES PATENT OFFICE.

THEOPHILE DE PORT, OF DAYTON, OHIO.

FRUIT PEELER.

Application filed September 18, 1922. Serial No. 588,821.

*To all whom it may concern:*

Be it known that I, THEOPHILE DE PORT, a citizen of the United States, residing at Dayton, in the county of Montgomery and State of Ohio, have invented certain new and useful Improvements in Fruit Peelers, of which the following is a specification, reference being had therein to the accompanying drawing.

My invention relates to articles for peeling fruit and the like in which it is necessary to remove a skin from the article.

It is a further object of my invention to provide a single implement which will be adapted to remove the skin from the fruit and the like without injury to the interior thereof.

It is particularly the object of my invention to provide in a single implement a means of severing the skin without damage to the interior of the fruit and then to provide another portion of the implement for detaching the skin from the fruit.

It is a further object to provide an implement which may be made of one piece of material and of any material such as bone, ivory, celluloid, aluminum, and the like.

Referring to the drawings:

Fig. 1 is a front elevation of my implement.

Fig. 2 is a side elevation of my implement.

Fig. 3 is an enlarged side elevation of the head of the implement.

Fig. 4 is a section on the line 4—4 of Fig. 2.

Fig. 5 is a section on the line 5—5 of Fig. 2.

Fig. 6 is a section on the line 6—6 of Fig. 2.

Fig. 7 is a section on the line 7—7 of Fig. 2.

Fig. 8 is a section on the line 8—8 of Fig. 2.

Fig. 9 is a side elevation to the portion of the orange in section showing the application of the cutting head for a shallow cut.

Fig. 10 is a side elevation of the cutting head at an angle to make a deep cut through a fruit having a thick skin.

Fig. 11 is a section through the cutting head on the line 12—12 of Fig. 9 with the fruit in section showing the method of lifting the edges of the skin.

Fig. 12 is a similar view showing the implement cutting a heavier skin and the use of the upper ledges or shoulder for turning back the skin. This view is on the line 13—13 of Fig. 10.

Fig. 13 is a perspective showing the use of the handle blade in peeling one-half of the skin from the fruit.

It will be understood that in the present drawings and this description I have selected an orange as a typical fruit, the skin which is to be removed.

Referring to the drawings in detail:

1 is a handle having a section shown in Fig. 7 with rounded corners 2 facilitating a gripping of the implement by the operator's hand to prevent slipping in case the handle is wet with the juice from the fruit. The rounded corners are provided to prevent injury to the operator's hand. The lower end of the implement which is slightly curved is provided with a thin tapering blade whose lower edge is flat, and whose upper edge is convex in cross section which will be seen in Fig. 13 inserted between the skin and the fruit to remove the skin after a portion of the skin has been severed from the other portion and the edges partially turned up or severed from the fruit. A plan view of 3 will be seen in Fig. 1, a side elevation in Fig. 2 and a section on the line 8—8 in Fig. 8.

Turning to the elevating and cutting head there will be seen that there is a back portion 4 slightly curved and integral with the handle. This back portion terminates in a semicircular portion 6. The forward side of the head is formed in a flat plate 8. This flat plate at its forward end is semicircular as at 9, and terminates in a point as at 10 at its rear end. It is substantially pear shaped in outline.

The point 10 also designates the upper end of a cutting edge 11 which recedes backwardly beneath 8 until it joins the forward face of the handle as at 12. The side walls of 8 taper inwardly and downwardly as at 13 until they join an outward and upward tapered portion 14 which terminates in the portion 4, so that 4 constitutes a rib on either side of the head. 13 and 4 together form a trough, the bottom of which is designated 15. The forward end of the trough merges into the head and the rear end terminates in the cutting edge 11. It will be also apparent that there is provided a flat guiding surface 8, a cutting edge 11 and an elevating trough composed of 13, 14 and 15 as well as the shoulders 4. In Fig. 1 the location of 15 can be seen from the dotted lines.

In practice the angle which 8 makes to the surface 16 of the fruit depends upon the thickness of the skin 17. If the skin is very thick as in Fig. 10 the surface 8 makes contact through a substantial portion of its length with the surface of the skin 16.

In operation the cutting edge 11 is used to sever the skin in two parts, the sharp point 10 facilitating the entrance into the skin.

As soon as this occurs the skin entering the trough bottom at 13, 14 and 15, known as the elevating trough, is elevated along its edges from the fruit so that the edge of the skin is turned back to permit the ready insertion of the blade 3 between the fruit and skin. The operator can then hold the fruit in one hand and move the blade progressively beneath the skin to detach the skin from the fruit or the blade may be held stationary and the fruit revolved for the same purpose. Likewise, in serving the skin either the fruit may be revolved or the knife turned across the fruit.

The handle is slightly curved in order to facilitate holding it and to accommodate the implement to the configuration of the usual fruit worked upon by such an implement.

It will be understood that I comprehend within my invention suitable modifications to adapt it to varying conditions and I do not desire to be limited to any particular detail.

Having thus fully described my invention what I claim as new and desire to secure by Letters Patent, is:—

1. A fruit peeling implement comprising a handle, a head thereon for severing the skin from the fruit, and an elevating trough on either side of the head to lift the edges of the skin from the fruit, said parts being formed integral with the handle.

2. A fruit peeling implement comprising a handle, a head having a guiding surface, an entering point, a cutting edge, and an elevating trough on either side of the head to lift the edges of the skin from the fruit, said parts formed integral with the handle.

3. An integral fruit peeling implement comprising a head consisting of a guiding surface, an entering point, a cutting edge, and an elevating trough, the latter having tapered walls, one of which is adapted to be inserted between the fruit and the skin and the other portion of which is adapted to deflect outwardly the skins so elevated.

4. An integral fruit peeling implement comprising a handle, a head thereon for severing the skin from the fruit, and an elevating trough on either side of the head having an outwardly deflecting member, said parts formed integral with the handle.

In testimony whereof I affix my signature.

THEOPHILE DE PORT.